(12) United States Patent
Sureshkumar et al.

(10) Patent No.: US 12,565,340 B2
(45) Date of Patent: Mar. 3, 2026

(54) LOW GRAVITY SIMULATOR

(71) Applicant: United Arab Emirates University, Al Ain (AE)

(72) Inventors: Vyshak Sureshkumar, Al Ain (AE); Khalifa Harib, Al Ain (AE); Adewale Oriyomi Oseni, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/357,613

(22) Filed: Oct. 14, 2025

(65) Prior Publication Data

US 2026/0035107 A1 Feb. 5, 2026

Related U.S. Application Data

(62) Division of application No. 18/404,510, filed on Jan. 4, 2024.

(51) Int. Cl.
*B64G 7/00* (2006.01)
*B66C 17/04* (2006.01)
(52) U.S. Cl.
CPC ..................................... *B64G 7/00* (2013.01)
(58) Field of Classification Search
None
See application file for complete search history.

(56) References Cited

U.S. PATENT DOCUMENTS 3,486,635 A * 12/1969 Stevenson ............. B66C 23/605
212/310
3,531,963 A * 10/1970 Garner ................... B21D 7/024
72/310
(Continued)

FOREIGN PATENT DOCUMENTS

CN       112357132 A      2/2021
CN       221006258 U  *  5/2024
(Continued)

OTHER PUBLICATIONS

Brown, "A Novel Gravity Compensation System for Space Robots", Article, 1993, 1-9, Robotics Institute—School of Computer Science.

*Primary Examiner* — Stephen D Meier
*Assistant Examiner* — Ruben C Parco, Jr.
(74) *Attorney, Agent, or Firm* — MH2 Technology Law Group, LLP

(57) ABSTRACT

A low gravity simulator configured to place an object under a simulated low gravity force is disclosed. The low gravity simulator comprises: a substantially vertically extending support column, wherein the support column comprises an air bearing; a boom, wherein the boom is mounted to the support column, and wherein the boom is rotatable about a vertical axis; a carriage, the carriage translatably mounted on the boom so that the carriage is, in use, movable backwards and forwards along the boom; a cable supported by the carriage and connectable at one end, in use, to the object; and a counterweight attached to the cable at an opposing end to apply a biasing force to the cable. The counterweight is restrained by the support column and the air bearing is configured to facilitate the motion of the counterweight with respect to the support column.

13 Claims, 5 Drawing Sheets

(56)                References Cited

U.S. PATENT DOCUMENTS

| | | | | |
|---|---|---|---|---|
| 3,658,187 A * | 4/1972 | Campbell | ............ | B66C 23/525 |
| | | | | 212/227 |
| 4,204,603 A * | 5/1980 | Ducreuzet | .............. | B66C 23/74 |
| | | | | 212/197 |
| 4,572,594 A | 2/1986 | Schwartz | | |
| 9,194,977 B1 | 11/2015 | Dungan et al. | | |
| 2001/0016090 A1 | 8/2001 | Takanashi | | |
| 2002/0121577 A1 | 9/2002 | Metelski | | |
| 2002/0158035 A1 * | 10/2002 | Delaney | ............... | B66C 23/027 |
| | | | | 212/250 |
| 2011/0249807 A1 | 10/2011 | Dirisio | | |

FOREIGN PATENT DOCUMENTS

| | | | | | |
|---|---|---|---|---|---|
| DE | 102008039981 B3 | | 4/2010 | | |
| DE | 102017205796 A1 * | 10/2018 | | ........... | B25J 9/0084 |
| JP | H03289533 A * | 12/1991 | | | |

* cited by examiner

LOW GRAVITY SIMULATOR

CROSS REFERENCE TO RELATED APPLICATION

This application is a divisional of U.S. application Ser. No. 18/404,510, filed 4 Jan. 2024, the entire disclosure of which is incorporated herein by reference.

TECHNICAL FIELD

The invention relates to a low gravity simulator that allows an object, for example a device intended to be operated on another celestial body other than Earth, to be placed under a simulated low gravity force.

BACKGROUND

In recent years, rovers became an integral part in the exploration of extra-terrestrial environments. These rovers must be self-sufficient and should be able to avoid obstacles and possible entrapments. Furthermore, it is highly challenging to traverse on small planetary bodies due to the weak gravitational fields present in those environments. Given the differences between the environment here on Earth and other celestial bodies, developing and designing rovers to work in such environments is considerably difficult to accomplish. At the time of filing, there has only been one successfully executed mission to an asteroid, which was managed by the Japan Aerospace Exploration Agency (JAXA).

In preparation for such exploratory missions, only a small number of methods to simulate these effects on Earth have been developed, for instance to test systems for extra vehicular activity (EVA) or space exploration tasks under reduced gravitational field. For example, testing rigs involving suspending training astronauts on wires at an angle of 9.5° from the vertical have been used to simulate effect of a lunar gravitational force; however, walking and jumping movements were constrained when using such rigs. A more sophisticated reduced-gravity simulator called POGO was developed by NASA and utilised vertical servo systems and a gimbal support system. POGO unfortunately exerts high inertial loads on the test subject and the resulting simulation did not match the dynamics of the subject's motion. The subject's range of motion was also limited. In another example, the buoyancy principle has been deployed by allowing astronauts to train in water tanks, which allowed the usage of all three degrees of freedom (DOF) but is limited in practicality due to the influence of hydrodynamic drag on the body which restricts motion of the body. Water dynamics also limit the accuracy of simulating a planetary environment under water.

Another method of reduced gravity testing involves using parabolic flight. Parabolic flights can achieve zero gravitational force or weightlessness, but their short duration reduces the economic viability of testing in the desired gravitational field. NASA developed another testing rig known as Active Response Gravity Offload System (ARGOS), which is intended to simulate all dynamic motion that is experienced by the human or robotic systems. ARGOS is based on a suspension system and consists of an overhead crane where the test subject is hung from a trolley by the means of cables. Using cable angle sensor, the system can actively track the motion of the test subject along x- and y-directions of the rig. ARGOS is limited to a small, 7 m×12 m, rectangular area and the supporting frame obstructs the working area of the testing rig.

Most of the types of systems identified above are either limited in two dimensions or the duration to attain required weightlessness is in seconds. Furthermore, these existing methods are all costly, which means they necessarily have been developed by well-resourced national and/or government agencies. Accessing such facilities can be difficult for new space agencies or research universities that specialize on space exploration and robotics despite the need to test exploration systems before deployment on missions where functional failures can be extremely costly. Nevertheless, there are an increased number of planned unmanned missions to planets as well as small celestial bodies and it is important to develop more accessible, cost-effective experimental platforms that can simulate low gravity for testing space rovers under various configurations in three-dimensional space.

SUMMARY

Disclosed in one aspect of the invention is a low gravity simulator that is configured to place an object under a simulated low gravity force. The low gravity simulator comprises: a substantially vertically extending support column, wherein the support column comprises an air bearing; a boom, wherein the boom is mounted to the support column, and wherein the boom is rotatable about a vertical axis; a carriage, the carriage translatably mounted on the boom so that the carriage is, in use, movable backwards and forwards along the boom; a cable supported by the carriage and connectable at one end, in use, to the object; and a counterweight attached to the cable at an opposing end to apply a biasing force to the cable, wherein the counterweight is restrained by the support column, and wherein the air bearing is configured to facilitate the motion of the counterweight with respect to the support column.

Disclosed in another aspect of the invention isa low gravity simulator that is also configured to place an object under a simulated low gravity force. The low gravity simulator comprises: a substantially vertically extending support column; a boom, wherein the boom is mounted to the support column, and wherein the boom is rotatable about a vertical axis; a carriage, the carriage translatably mounted on the boom so that the carriage is, in use, movable backwards and forwards along the boom; a cable supported by the carriage and connectable at one end, in use, to the object; a counterweight attached to the cable at an opposing end to apply a biasing force to the cable; a force feedback sensor, wherein the force feedback sensor is connected to the counterweight and is configured to detect a variance in the biasing force; and a force control system, the force control system configured to, in response to a detected variance in the biasing force, apply a controlling force to the cable.

Disclosed in another aspect of the invention is a low gravity simulator that is also configured to place an object under a simulated low gravity force. The low gravity simulator comprises: a substantially vertically extending support column; a boom, wherein the boom is rotatable about a vertical axis, and wherein the boom radially extends from a proximal end, where the boom is mounted to the support column, to a distal end; a carriage translatably mounted on the boom so that the carriage is, in use, movable backwards and forwards along the boom; a cable supported by the carriage and connectable at one end, in use, to the object; and at least one boom positioning unit, the boom positioning unit configured to apply a circumferential force to the boom at, or near, the distal end of the boom to cause the boom to, in use, rotate about the vertical axis.

Further optional features are described herein and a selection of those features are set out in the dependent claims.

BRIEF DESCRIPTION OF THE DRAWINGS

Further features of the disclosure are described hereinafter, by way of non-limiting examples of the invention, with reference to and as illustrated in the accompanying drawings, in which.

DETAILED DESCRIPTION

In this description, the term "object" shall be interpreted to include apparatuses, payloads, animals, and humans that may be subjected to simulated low gravity evaluations in preparation for deployment in space exploration tasks under reduced gravitational fields.

The Applicant has developed a low gravity simulator that allows for an improved testing space for the object or person to move around in as they are testing out equipment or experimenting with a device in simulated low gravity. The low gravity simulator will also allow for improved control over the simulated low gravity by controlling the force applied to the object.

Figure 1:
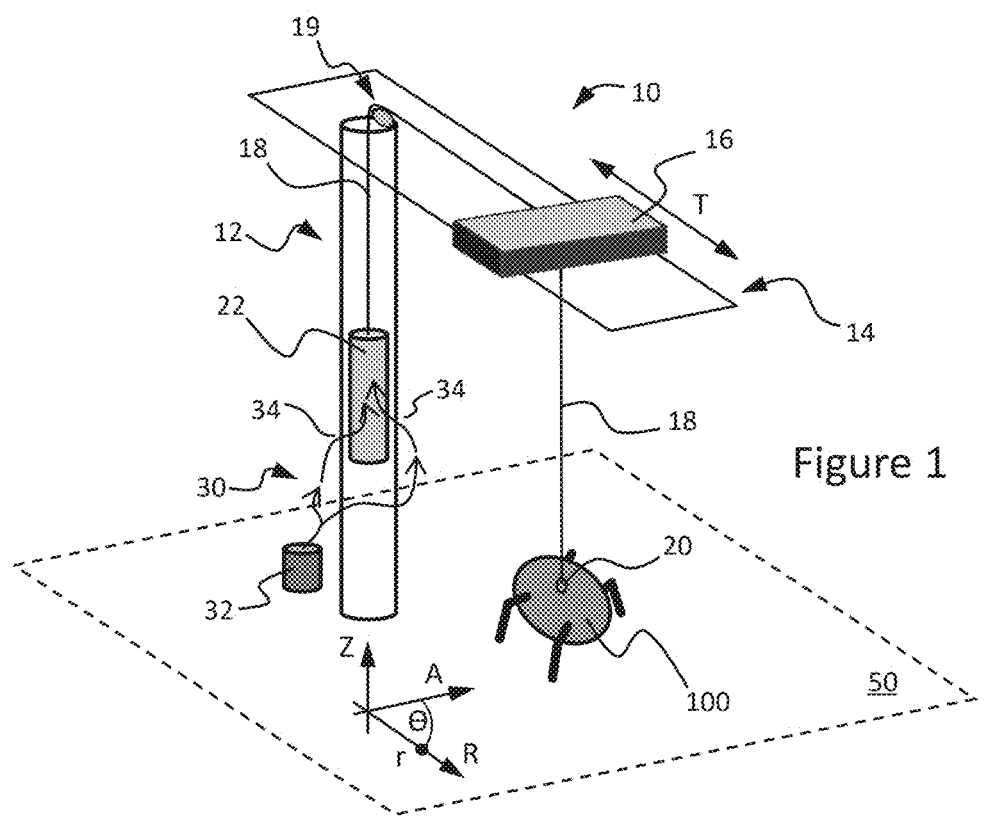
FIG. 1 schematically illustrates an embodiment of a low gravity simulator, as described herein.

FIG. 1 illustrates one embodiment of a low gravity simulator 10, as conceived by the Applicant, configured to place an object 100 under a simulated low gravity force. The low gravity simulator comprises a support column 12 that extends substantially vertically along a Z-axis as shown in FIG. 1. In some examples, the support column 12 extends substantially vertically from a base platform 50 on which an object may be evaluated in use. The base platform 50 may be filled with regolith and boulders to simulate the extra-terrestrial environment. The base platform 50 is adaptable in geometry and materials so that simulation of the terrain on different planets/small bodies can be accommodated.

A boom 14 is mounted to the support column 12 in an elevated position. For example, the boom 14 may be mounted to the support column 12 in an elevated position at a certain pre-determined height above the base platform 50. The boom 14 is mounted so that the boom 14 can rotate about the Z-axis. For instance, the boom 14 may be rotatably mounted to the support column 12 so that the boom 14 can rotate about the Z-axis. In another example, the support column 12 may be rotatable about the Z-axis and rotate with the boom 14 during use.

As the boom 14 can rotate about the Z-axis, the angular position of the boom 14 can therefore be defined in terms of a cylindrical coordinate system having an origin lying somewhere along the Z-axis on a suitably selected (substantially horizontal) reference plane. For instance, the origin could be located at an intersection with the base platform 50 or where the boom 14 is mounted to the support column 12. The angular position θ of the boom 14 can be measured from any suitable reference direction (A). As shown in FIG. 1, the boom 14 extends longitudinally in a radial direction R (in terms of the cylindrical coordinate system) from a proximal end, where the boom 14 is mounted to the support column 12, to a distal end. In one example, the boom 14 extends horizontally from the proximal end to the distal end.

A carriage 16 is translatably mounted on the boom 14. The carriage 16 is linearly movable backwards and forwards (i.e., translatable direction T in FIG. 1) along the length of the boom 14 such that the carriage 16 is translatable in the radial direction R. The carriage 16 may be mounted on the boom 14 by any suitable means, for example on a guided rails or rollers. The carriage 16 supports a cable 18. The cable 18 is connectable at a hooking end, in use, to the object 100 so that the object 100 can be subjected to a lifting force and therefore a simulated low gravity force in a testing space beneath the carriage 16 and boom 14. For instance, the cable 18 may be connected by way of a shackle 20 or other suitable hooking means.

The cable 18 is guidably constrained along the length of the boom 14 to the proximal end of the boom 14 such that the cable 18 can slide freely when the carriage 16 moves along the boom 14 to accommodate radial direction movement of the object 100 and/or as the object 100 moves in the vertical direction. At an opposing end to the hooking end, the cable 18 is attached to a counterweight 22. In the example shown, the counterweight 22 is restrained by the support column 12 but is free to move vertically with the guided cable 18 so as to accommodate movement of the object 100, for instance around the and above the base platform 50. Using gravity, the counterweight 22 applies a biasing force to the cable 18. Thus, a lifting force is in turn applied to the object 100 through the cable 18, thereby simulating a low gravity environment.

In this way, through motion of the boom 14, carriage 16, cable 18, and counterweight 22, the low gravity simulator 10 can accommodate self-propelled movement of the object 100 anywhere in the three-dimensional space, defined in terms of the cylindrical coordinate system, under an allowable swing arc of the boom 14. Because the low gravity simulator 10 permits full three degrees-of-freedom (r, θ, z) of movement for the hooking end of the cable 18, the simulator 10 can accommodate vertical movement and horizontal movement of the object 100 in any direction. In other words, the object 100 is provided with full three degrees-of-freedom (r, θ, z) of movement within the allowable volume provided by the simulator 10.

The object 100 can make rapid small movements that involve accelerations and decelerations of the cable 18 and also be subject to external disturbances when under evaluation in the testing space. To compensate for these movements and disturbances, the low gravity simulator 10 may also comprises a force control system (not illustrated in FIG. 1) that is configured to apply a controlling force to the cable 18.

The force control system may be located within the support column 12. In other examples, the force control system may be located on the carriage 16 or on the boom 14. In one example, the force control system comprises control force applicator, such as a motor, configured to apply a controlling force to the cable 18. For instance, the motor may apply a controlling force via torque applied to a powered wheel or drum. In some examples, more than one motor may be used, where each motor is located in a different place. In this way, and in combination with the lifting force applied by the counterweight, the movements of the object 100 as the object is evaluated in the low gravity simulator 10 can be finely controlled so that as near as possible constant low gravity environment is applied to the object 100. The force control system may also function in concert with the counterweight 22 to allow for motion of the object 100 in the Z-axis direction, for instance if the object 100 ascends or descends a testing slope that is placed in the testing area.

So that the correct amount controlling force can be variably applied as necessary to the cable 18 to maintain a constant lifting force on the object 100, the forces experienced by the object 100 may be monitored and that information is used to adjust the amount of controlling force that is applied to the cable 18. In certain examples, the counterweight 22 is connected, for instance at the end of the counterweight 22, to a load cell that acts as a force feedback sensor that monitors the varying load on the cable 18. Movement of the object may be dynamic and is permissible in all directions as discussed above; hence, the movement along the reference plane (i.e., in the radial and angular directions) may also be controlled by monitoring the motion of the object 100 using feedback sensors on the angular positional control elements, such as the elements described below. Other sensors may also be employed to monitor the motion of the object within the testing space—for instance, machine vision systems or pressure sensors may be employed to positionally monitor the motion of the object within the testing space.

The low gravity simulator 10 may also comprise one or more controllers to control the functions of the low gravity simulator 10. The one or more controllers may each comprise one or more processors configured to execute machine readable instructions. The one or more processors may be communicatively connected to one or more memory modules that may be configured to store machine readable instructions that, when executed by the processors, cause the low gravity simulator 10 perform certain functions. For instance, the machine-readable instructions may comprise sensor monitoring functions and motion causing instructions such as motion of the boom 14 and/or force control of the biasing force applied to the cable. The force control system and/or sensors may be communicatively coupled to the one or more controllers to permit control of the force control system and/or monitoring of the output of the sensors. The one or more controllers may also be used to control the radial position of the carriage 16, for instance using the carriage positioning system described below, and the rotational position of the boom 14, as well as ensuring that the Z-axis position of the object 100 is accounted for using the force-controlled counterweight 22.

In the embodiment shown in FIG. 1, the counterweight 22 is located within the support column 12, for instance within a cavity of the support column 12. For example, the counterweight 22 may be located within a hollow support column 12. In certain examples, the counterweight 22 may be concentrically arranged with the support column 12 about the Z-axis. For example, the support column 12 may be tubular such as a hollow cylindrical shape with the counterweight suitably shaped to be concentrically arranged with the support column 12. The cable 18 may be attached concentrically to the counterweight 22 about the Z-axis. In other words, the cable 18 may be arranged so that the cable 18 is attached and passes through the support column 12 in a concentric arrangement. The counterweight 22 may also be cylindrical in shape although other shapes may function equally as well where the cable 18 is attached concentrically to the counterweight 22. This arrangement allows the counterweight 22 to rotate with the boom 14 at the same angular rate thereby minimising mechanical complication. This may be particularly beneficial where the boom 14 is rotatably mounted to the support column 12 so that the boom 14 can rotate about the Z-axis. To facilitate this arrangement and allow the cable 18 to be retained in the correct concentric position relative to the support column 12, the cable may be pass through a pulley 19 that is mounted on the boom 14 immediately above an opening in the support column 12.

Referring again to FIG. 1, the support column 12 may comprise an air bearing 30. The air bearing 30 is configured to facilitate the motion of the counterweight with respect the support column 12. For example, when the counterweight 22 is located within the support column 12, the air bearing is configured to facilitate the motion of the counterweight within the support column 12. The air bearing 30 facilitates the desired motion by minimizing friction experienced by the counterweight 22 as the counterweight 22 is moved against the restraining action of the support column 12, for instance within the cavity of the support column 12. Furthermore, the air bearing 30 acts to smooth out the motion of the counterweight 22 thereby minimising the disturbances to the biasing force being applied to the cable 18. Thus, the force applicator and the air bearing 30 may work in concert to maintain the application of a constant lifting force to the object 100.

In one example, the air bearing 30 comprises a flow generator 32 to provide air at a positive pressure, relative to the atmosphere, to the support column 12. For instance, the flow generator 32 may supply air into a cavity of the support column 12. The air bearing 30 may also comprise a plurality of perforations 34 in the wall of the support column 12. The perforations 34 allow air to flow from the generator 32, through the cavity of the support column 12, and out of the support column 12. The perforations 34 allow air to flow over the surface of the counterweight 22. For instance, where the counterweight 22 is located within the cavity of the support column 12, the perforations 34 allow air to flow from the generator, into the cavity of the support column 12, over the surface of the counterweight 22, and out of the support column 12. The air flowing over the counterweight 22 acts as an air bearing that substantially reduces the frictional force acting on the system.

In one example of the low gravity simulator 10, a motor may be coupled to the support column 12 to cause rotation of the support column 12 and boom 14 relative to the base platform 50 or ground. Alternatively, a motor may be coupled to the support column 12 to cause rotation of the boom 14 relative to the support column 12. In another embodiment, the support column 12 and/or boom 14 may be rotatable relative to the base platform 50 or ground in a passive manner with respect to the support column 12 and/or ground where the driving force is provided on the boom 14 in another way, such as the boom positioning unit described below.

Figure 2:
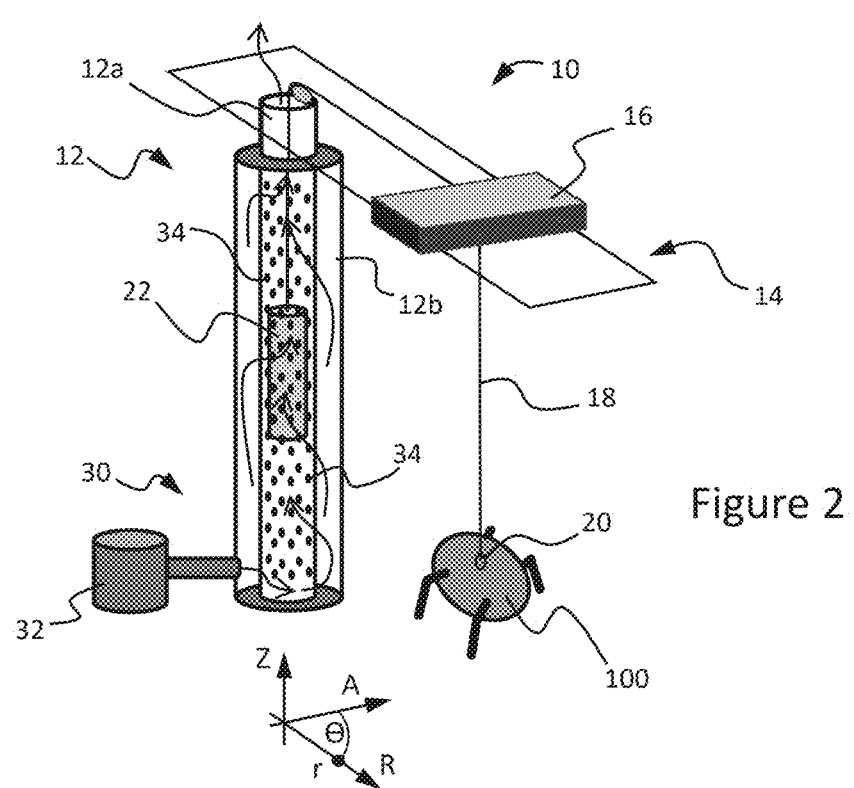
FIG. 2 schematically illustrates another embodiment of a low gravity simulator, as described herein.

FIG. 2 illustrates another embodiment of a low gravity simulator 10, as conceived by the Applicant, configured to place an object 100 under a simulated low gravity force. Those features that the low gravity simulator 10 of FIG. 2 has in common with the low gravity simulator 10 of FIG. 1 are indicated with like-numbered reference signs.

In the embodiment shown in FIG. 2, the support column 12 has been arranged to control the flow of air in the support column 12 to facilitate the air bearing 30 function. The support column 12 comprises inner 12a and outer 12b columns. The inner 12a and outer 12b columns may be cylindrical in shape. In certain examples, the inner 12a and outer 12b columns may comprise substantially concentrically arranged cylinders.

The top and bottom ends of the outer column 12b are sealed so that the outer column 12b forms a duct around the inner column 12a, for instance in the shape of an annular section defined by the inner 12a and outer 12b columns. Air, pumped from the flow generator 32, flows into the duct under pressure to be delivered to a plurality of perforations 34 defined in the in the wall of the inner column 12a. The inner column 12a is open to the atmosphere, for instance at the top end of the inner column 12a, so that the air passes through the plurality of perforations 34, over the surface of the counterweight 22, and out of the support column 12.

The inner column 12a can be dimensioned such that the counterweight 22 is close to the inner surface of the inner column 12a. For instance, the inner diameter of a cylindrically shaped inner column 12a can be close to the diameter of a cylindrically shaped counterweight 22. The gap between the counterweight 22 and the inner surface of the inner column 22a can be dimensioned such that the counterweight 22 is cushioned by the air passing through those perforations from the plurality of perforations 34 that are in the locale of the counterweight 22 at a particular moment of operation. This minimizes the friction or contact between the inner surface of the inner column 12a and the counterweight 22. The flow generator 32, for example a compressor, is connected to the outer column 12b so as to be in fluid communication with the duct, for instance as shown in FIG. 2.

Figure 3:
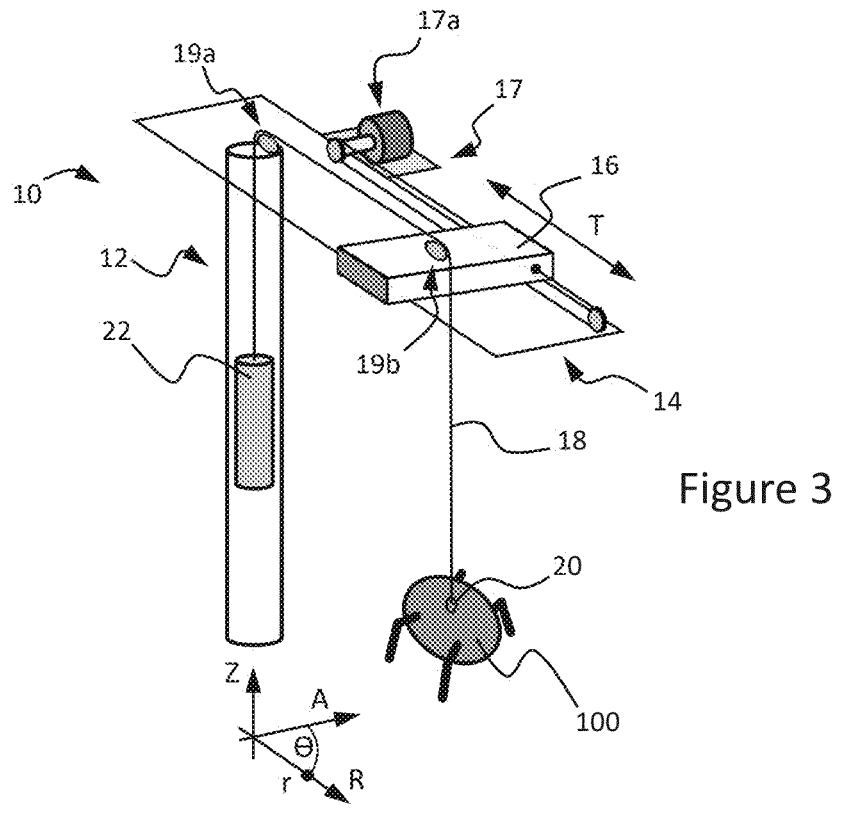
FIG. 3 schematically illustrates another embodiment of a low gravity simulator, as described herein.

FIG. 3 illustrates another embodiment of a low gravity simulator 10, as conceived by the Applicant, configured to place an object 100 under a simulated low gravity force. Those features that the low gravity simulator 10 of FIG. 2 has in common with the low gravity simulator 10 of FIG. 1 are indicated with like-numbered reference signs.

FIG. 3 illustrates one example of a carriage positioning system 17 that may be used to linearly move the carriage 16 backwards and forwards (i.e., translatable direction T) along the length of the boom 14 such that the carriage 16 is translatable in the radial direction R. In the example shown in FIG. 3, the carriage 16 is powered by a motor 17a that is mounted on the boom 14 near to the support column 12. The carriage positioning system 17 comprises a cable or belt pulley system. Each end of the cable or belt is fixed to the carriage 16 so that activation of the driver pulley by the motor 17a causes the carriage 16 to translate along the boom 14 in a backwards or forwards direction depending on the desired direction of travel. The carriage positioning system 17 allows keeping the carriage 16 always vertically above the object 100 by keeping the cable 18 substantially vertical between the carriage 16 and the object 100 when the object 100 is moving in the testing space beneath the boom 14 and carriage 16.

FIG. 3 also illustrates how the low gravity simulator 10 may comprise a pair of pulleys 19a, 19b that support the cable 18 as discussed below with respect to FIG. 7. In this instance, one of the pulleys 19b may be arranged on the carriage 16 and the other 19a at the proximal end of the boom 14 or on the support column 12.

Figure 4:
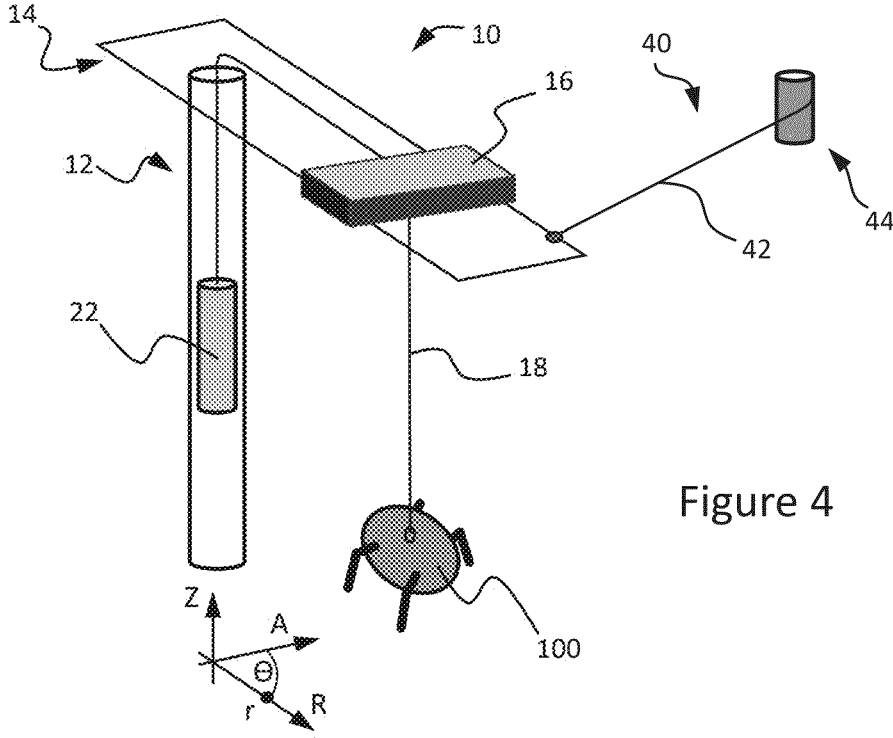
FIG. 4 schematically illustrates another embodiment of a low gravity simulator, as described herein.

FIG. 4 illustrates another embodiment of a low gravity simulator 10, as conceived by the Applicant, configured to place an object 100 under a simulated low gravity force. Those features that the low gravity simulator 10 of FIG. 4 has in common with the low gravity simulator 10 of FIG. 1 are indicated with like-numbered reference signs.

In the embodiment shown in FIG. 4, the low gravity simulator 10 comprises at least one boom positioning unit 40. The boom positioning unit 40 is configured to apply a circumferential force, i.e., a force in the circumferential direction in terms of the cylindrical coordinate system described hereinabove, to the boom 14 at, or near, the distal end of the boom 14. The application of the circumferential force facilitates the angular motion of the boom 14 about the Z-axis. The boom positioning unit 40 removes the need for cumbersome machinery to be placed in the support column 12 or at the proximal end of the boom 14 to facilitate angular motion of the boom 14. For instance, a rotary actuator such as a motor may be used instead but this can increase the mass and bulk of the column support 12 and/or boom 14. Thus, the boom positioning unit 40 allows for a less bulky, simpler support column 12 and/or boom 14.

The use of the boom positioning unit 40 also allows the boom 14 to extend to a longer overall length. This in turn allows the carriage 16 to reach a larger radius so that the area (and thus the spatial volume) in which the object 100 may be evaluated in a low gravity environment to be much larger. In particular, the boom positioning unit 40 may be used to support the end of the boom 14 to counter the effects of gravity on what would otherwise be a cantilevered boom 14. Accordingly, the boom 14 can be longer because the boom positioning unit 40 may, in some examples, apply a vertical force component to the distal end of the boom 14.

To apply the radial force component to the boom 14, in the example shown in FIG. 4, the boom positioning unit 40 comprises a linear member 42 that is configured to apply a pushing and/or pulling force to the distal end of the boom 14. The boom positioning unit 40 also comprises a driver 44 to move the linear member 42 and thereby push or pull the boom 14 so as to apply the circumferential force to the boom 14 and cause the boom 14 to rotate about the Z-axis. The boom positioning unit 40 may comprise a support to hold the driver 44 and linear member 42 in place.

For instance, the boom positioning unit 40 may be mounted to the ceiling of a testing facility (which can allow for more testing space beneath the boom 14) or supported on a supporting pole.

In some examples, where the linear member 42 is configured to apply a pushing and a pulling force, the linear member 42 may be rigid, such as a connecting rod, or be a rigid chain or rack that is driven by a pinion system or ball-screw-nut mechanism.

In other examples, the linear member 42 may be a cable, chain, rope, or belt configured to apply the circumferential force under tension. In such examples, the driver 44 may comprise a controlled winding device on which the cable, chain, or belt can be spooled or unspooled. For instance, a cable may be wound on and off a controlled winch onto which the cable, chain, or belt can be wound thereby applying a pulling force distal end of the boom 14.

Figure 5:
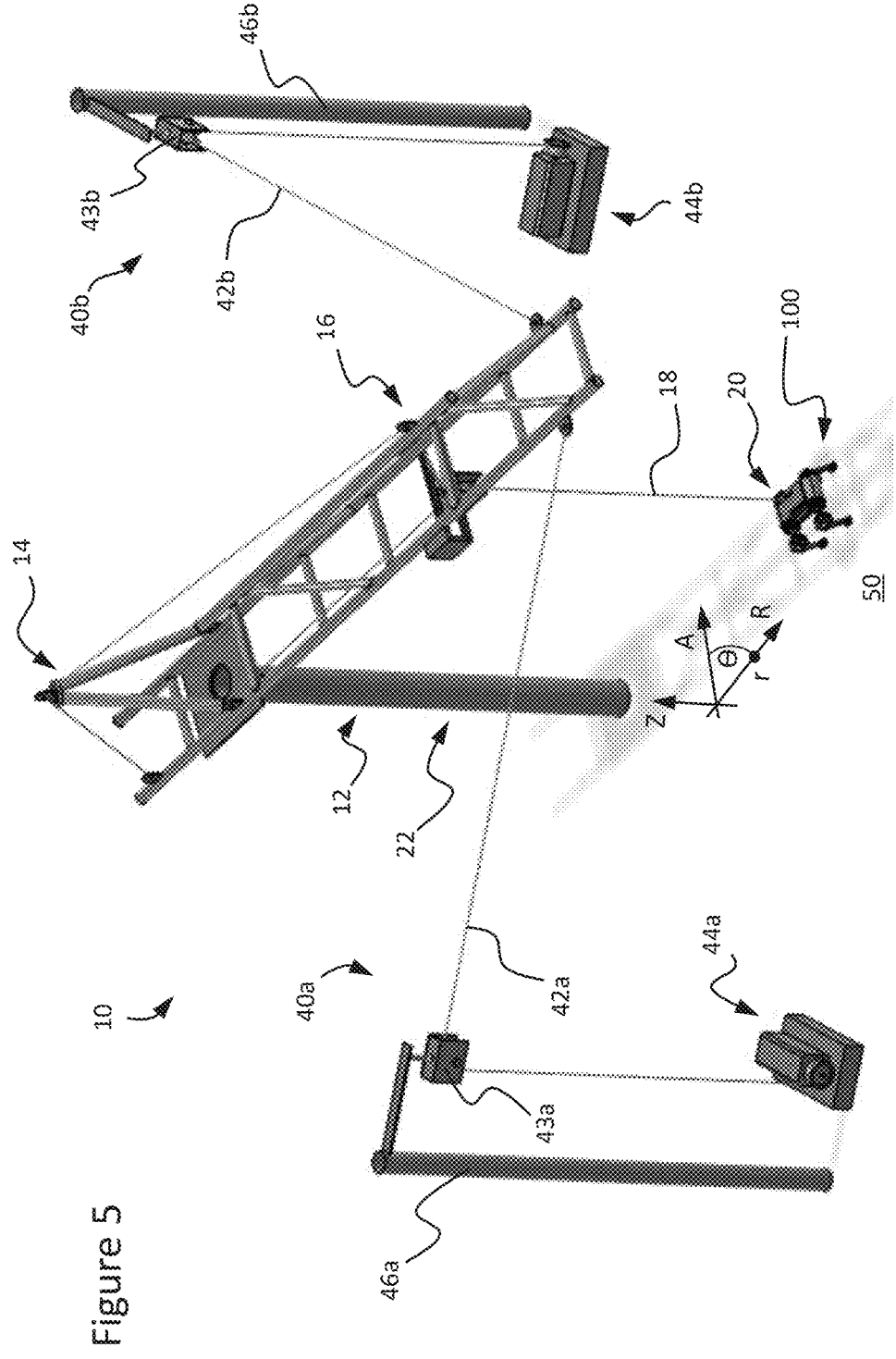
FIG. 5 illustrates a view of another embodiment of a low gravity simulator, as described herein.
Figure 6:
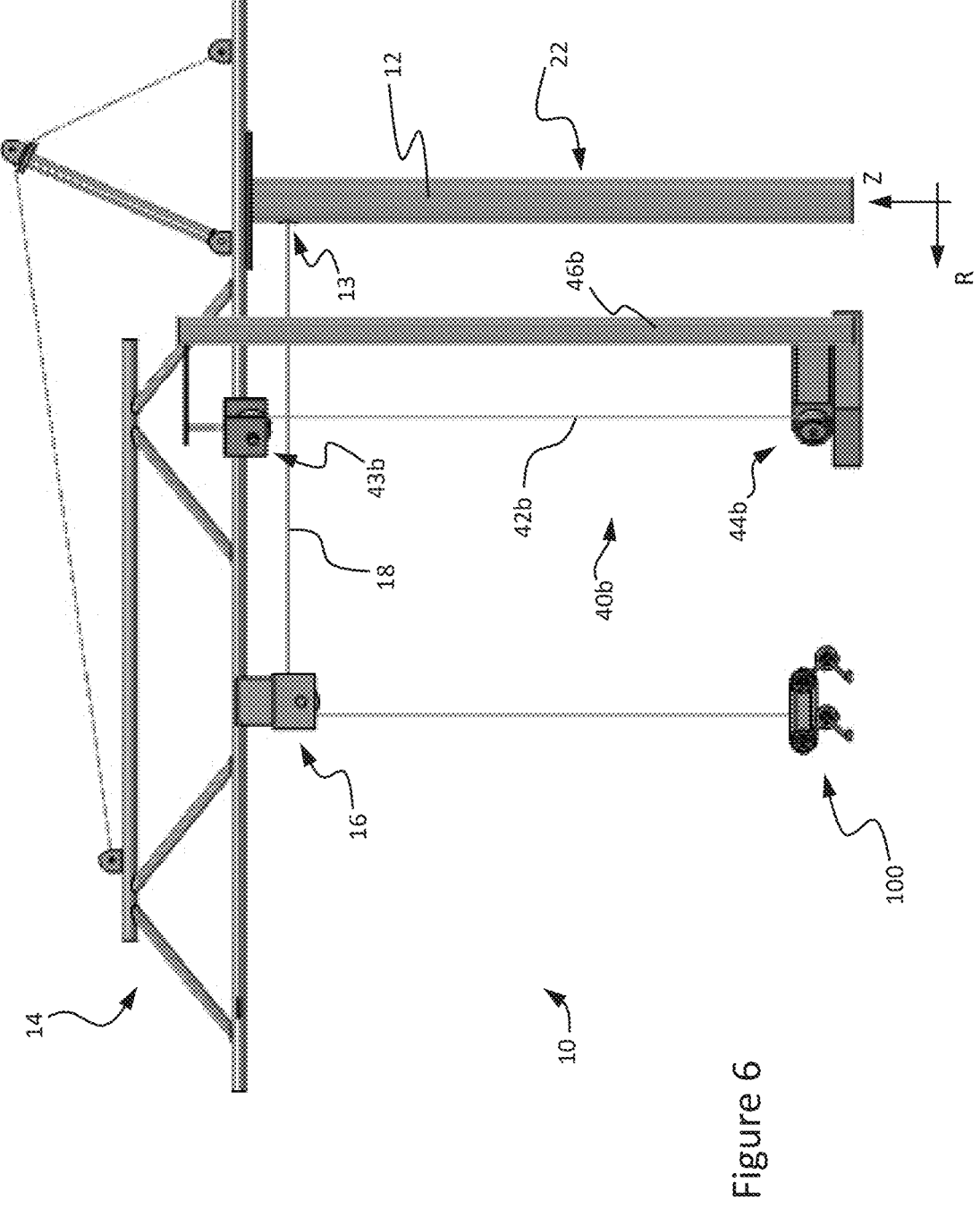
FIG. 6 is a side view of the low gravity simulator shown in FIG. 5.

The Applicant has conceived that, in one example, the low gravity simulator is provided with a pair of boom positioning units. As illustrated in the arrangement conceived by the Applicant and shown in FIGS. 5 and 6, each boom positioning unit 40a, 40b from the pair of boom positioning units is located on a respective side of the boom 14. As shown in the example of FIGS. 5 and 6, the driver 44a, 44b (and thus the support) is spaced a certain distance away from the boom 14 thereby allowing the boom 14 space to rotate. In the example shown in FIGS. 5 and 6, each driver 44a, 44b comprises a winch onto which a cable 42a, 42b is wound.

Providing a pair of boom positioning units allows the use of a tension member on each side of the boom 14, such as the cable, chain, or belt, to apply a pulling force on each side of the boom 14 as desired and therefore control the position of the boom 14. The use of a cable, for instance, allows for a lighter linear member than a rigid chain, for example. Furthermore, the use of cables on both sides of the boom 14 at the distal end can be used to support the boom 14 evenly on each side and increase the length to which the boom 14 can be extended.

As can be seen in FIG. 5, cables 42a, 42b are attached at the distal end of the boom 14 on respective sides of the boom 14. The cables 42a, 42b are each guided by respective supporting pulleys 43a, 43b to respective winches 44a, 44b that are, in this instance, mounted on the ground. The winches may be mounted elsewhere, for instance on a ceiling of a testing facility. Respective supports in the form of poles 46a, 46b are provided to support the pulleys 43a, 43b, and thus the cables 42a, 42b.

Activation of one of the winches causes winding of the respective cable 42a, 42b onto the respective winch thereby causing the boom 14 to rotate towards the respective winch. During winding of one winch, the other winch can be made passive in that the cable not being used to pull on the boom 14 is allowed to spool out from the passive winch and allow the boom 14 to rotate. In some examples, during winding of one winch, the other winch can be used as a braking winch to allow finer control of the rotational position of the boom 14. The winches can also act as a braking system to hold the boom 14 in position or to control the speed of the non-active cable 42a, 42b being spooled off the winch.

During activation of the boom positioning unit(s) the boom 14 and/or the support column 12 are free rotate about the Z axis. In other words, the rotational motion of the support column 12 and/or the boom 14 is passive, and the rotation of the boom 14 is enabled by the two cables 42a, 42b attached to the distal end of the beam 14 on respective sides. In the example shown in FIG. 6, the support column 12 is arranged to rotate with the boom 14. An opening 13 is provided in the wall of the support column 12 to facilitate the cable 18 connection between the object 100 and the counterweight 22.

The low gravity simulator 10 operates on the basis that the cable 18 connected to the object 100 is maintained vertical with respect to the ground (for example, the base platform 50); in other words, aligned with the Z-axis. The linear member 42, for example cables 42a, 42b, may be controlled using the one or more controllers described above. For instance, the motion of the boom 14 may be carried out by controlling the cables 42a, 42b using the respective winches, which are communicatively coupled to the one or more controllers. Thus, the motion of the boom 14 can be controlled to dynamically match the position of the object 100 in the testing space beneath the boom 14 and carriage 16. The radial motion of the carriage 16 may also be controlled to dynamically match the position of the object 100 in the testing space. In conjunction with the compensation of the Z-axis motion of the object 100 described above, the low gravity simulator 10 is able to, in certain embodiments, match the dynamic motion of the object 100 in all three directions of the coordinate system. For instance, as well as tracking any deviation to the required gravitational force by adjusting the motor torque controlling the counterweight 22, any deviation in the angular location of the object 100 can be matched by using the one or more controllers to manage the drivers 44a, 44b and thereby control the linear members 42a, 42b that control the rotational position of the boom 14. Similarly, the one or more controllers can be used to manage the radial position of the carriage 16. The one or more controllers can synchronize motion of the winches connecting the cables 42a, 42b controlling the rotation of the boom

14 along with the motion along the Z-axis to synchronize with the dynamic motion of the object 100 (for example, a rover) with minimal lag in communication thereby providing an almost exact low gravitational field as expected. Thus, as well as accounting for the movements of the object 100 when delivering the lifting force to the object 100 during evaluation in the low gravity simulator 10, compensation for the influence of external disturbances on the object 100 in the radial and angular directions can also be provided.

As well as low gravity simulator 10 being able to match the dynamic motion of the object 100 in all three directions of the coordinate system, in certain examples the low gravity simulator 10 can be configured to control the dynamic motion of the object 100, such as a test rover, in all three directions of the coordinate system. In other words, some examples of the low gravity simulator 10 may be used to control motion of the object 100 as well as provide a simulated low gravity field.

Figure 7:
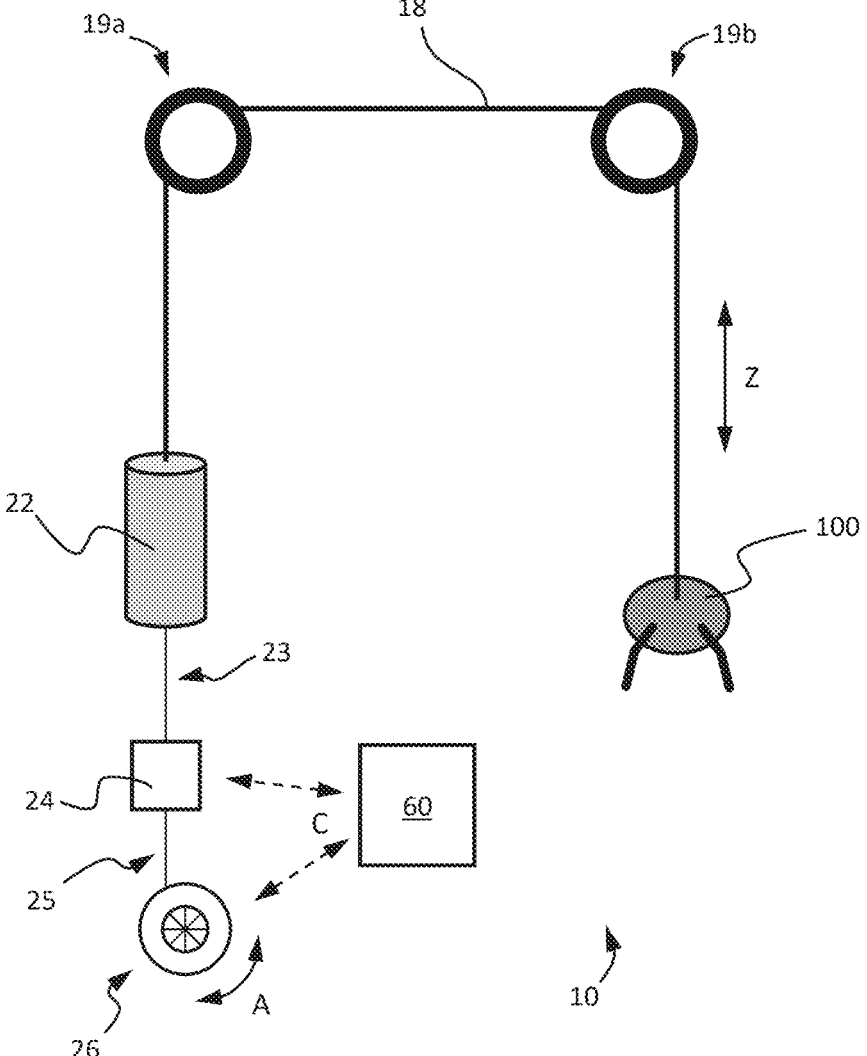
FIG. 7 schematically illustrates another embodiment of a low gravity simulator, as described herein.

FIG. 7 illustrates one example of a low gravity simulator 10 comprising a force feedback sensor, as tested by the Applicant, to monitor the varying load on the cable 18. By monitoring the load on the cable 18, any variance of the biasing force applied to the object 100 can be detected. The biasing force can then be controlled, by the force control system, to compensate for the variance so that the object 100 is subjected to a consistent simulated gravity field during testing. Only certain features the low gravity simulator 10 are illustrated in FIG. 7. The force feedback sensor may be included in any of the embodiments described herein. In certain embodiments, the force feedback sensor may be included in the low gravity simulator 10 without the air bearing 30 and/or without the boom positioning unit 40.

Referring to FIG. 7, the low gravity simulator 10 comprises a pair of pulleys 19a, 19b that support the cable 18. For instance, one of the pulleys 19b may be arranged on the carriage 16 and the other 19a at the proximal end of the boom 14 or on the support column 12. The difference in weight between the object 100 and the counterweight 22 will result in the required gravitational force. A load cell 24 is connected to the counterweight 22. For instance, the load cell 24 may be connected 23 to the lower end of the counterweight 22. The load cell 24 is also connected 25 to a driven pulley 26 that applies a variable force to the load cell 24 through the connection 25. The force applied to the load cell 24 may be controlled in response to a variance in the biasing force being applied to the cable 18 being detected using the load cell 24. For instance, a motor may be used to apply a variable torque level A to the driven pulley 26 thus vary the force applied to the load cell 24 via the connection 25 and hence apply a controlling force to the cable 18. The connection 25 may comprise a cable wound onto the pulley 26, for example.

The load cell acts as a force feedback sensor and, in conjunction with the driven pulley 26, can be used to control the biasing force applied to the cable 18 and thus the lifting force applied to the object 100. In this way, the simulated gravity field to which the object 10 is subjected can be controlled. The load cell 24 may be communicatively coupled C to a controller 60, such as the one or more controllers described above. The controller 60 may also be coupled to the motor to control the torque applied to the driven pulley 26. For instance, the controller 60 may control the torque applied to the driven pulley 26 in response to information regarding the level of biasing force applied to the cable 18 that has been communicatively acquired from the load cell 24. Movement or disturbances of the object 100 in the Z-direction, as shown in FIG. 7, may thus be compensated for by the low gravity simulator 10 using the to ensure that the simulated gravity field to which the object 100 is subjected remains substantively constant.

It will be understood that the above embodiment descriptions are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention. It is to be understood that any feature described in relation to one example may be used alone, or in combination with other features described, and may also be used in combination with any features of any other of the examples, or any combination of any other examples.

The invention claimed is:

1. A low gravity simulator configured to place an object under a simulated low gravity force, the low gravity simulator comprising:

a substantially vertically extending support column, wherein the support column comprises an air bearing;

a boom, wherein the boom is mounted to the support column, and wherein the boom and the support column are rotatable about a vertical axis, wherein the boom extends longitudinally in a radial direction R from a proximal end of the boom and the boom extends horizontally from the proximal end to a distal end of the boom;

a carriage, the carriage translatably mounted on the boom so that the carriage is, in use, movable backwards and forwards along the boom;

a cable supported by the carriage and connectable at one end, in use, to the object;

a counterweight attached to the cable at an opposing end to apply a biasing force to the cable, wherein the counterweight is restrained by the support column, and wherein the air bearing is configured to facilitate the motion of the counterweight with respect to the support column;

a first tension member attached to the distal end of the boom at a first side of the boom, the first tension member providing a first vertical force component to the distal end of the boom; and a second tension member attached to the distal end of the boom at a second side of the boom, the second tension member providing a second vertical force component to the distal end of the boom, wherein the second side of the boom is opposite the first side of the boom.

2. The low gravity simulator of claim 1, wherein the counterweight is located within the support column, and wherein the air bearing is configured to facilitate the motion of the counterweight within the support column.

3. The low gravity simulator of claim 2, wherein the cable is attached to the counterweight to be concentrically arranged with the support column about the vertical axis.

4. The low gravity simulator of claim 1, wherein the air bearing comprises a flow generator to provide, in use, air at a positive pressure, relative to the atmosphere, to the support column.

5. The low gravity simulator of claim 4, wherein the flow generator supplies air to a cavity of the support column, and wherein the air bearing comprises a plurality of perforations in the wall of the support column to allow air to flow out of the support column, and the counterweight is located within the cavity, and wherein the perforations allow air to flow over the surface of the counterweight and out of the support column.

6. The low gravity simulator of claim 1, wherein the low gravity simulator comprises a force control system, wherein the force control system is configured to, in response to a detected variance in the biasing force, apply a controlling force to the cable to return the simulated low gravity force to a pre-determined level.

7. The low gravity simulator of claim 1, wherein the low gravity simulator comprises a force feedback sensor connected to the counterweight, and wherein the force feedback sensor is configured to detect a variance in the biasing force.

8. The low gravity simulator of claim 7, wherein the force feedback sensor comprises a load cell connected to the counterweight.

9. The low gravity simulator of claim 8, wherein the load cell is connected to a driven pulley configured to apply a variable force to the load cell.

10. The low gravity simulator of claim 1, wherein the support column extends substantially vertically from a geometrically adaptable base platform on which the object may be evaluated in use.

11. The low gravity simulator of claim 1, wherein the low gravity simulator comprises one or more controllers to control the functions of the low gravity simulator.

12. The low gravity simulator of claim 1, wherein the first tension member comprises a first tension cable.

13. The low gravity simulator of claim 1, wherein the first tension member and the second tension member are configured to support the boom such that first vertical force component equals the second vertical force component.

* * * * *